United States Patent
Marisa

(10) Patent No.: US 9,109,875 B2
(45) Date of Patent: Aug. 18, 2015

(54) ROOFING TEMPLATE AND METHOD OF CUTTING ROOFING SHINGLES

(71) Applicant: Mario David Marisa, Tire Hill, PA (US)

(72) Inventor: Mario David Marisa, Tire Hill, PA (US)

(73) Assignee: Mario David Marisa, Tire Hill, PA (US)

( * ) Notice: Subject to any disclaimer, the term of this patent is extended or adjusted under 35 U.S.C. 154(b) by 142 days.

(21) Appl. No.: 13/987,993

(22) Filed: Sep. 23, 2013

(65) Prior Publication Data

US 2015/0082647 A1  Mar. 26, 2015

(51) Int. Cl.
G01B 3/14 (2006.01)
E04D 15/02 (2006.01)

(52) U.S. Cl.
CPC ............... *G01B 3/14* (2013.01); *E04D 15/025* (2013.01); *Y10T 83/0448* (2015.04)

(58) Field of Classification Search
CPC ............. G01B 3/14; B25H 7/00; B25H 7/04; B43L 13/02
USPC .............................. 33/32.1, 32.2, 33, 41.1, 42
See application file for complete search history.

(56) References Cited

U.S. PATENT DOCUMENTS

| | | | | |
|---|---|---|---|---|
| 4,503,618 A * | 3/1985 | Eberhardt | .................. | 33/645 |
| 4,730,398 A * | 3/1988 | Stanton | .................. | 33/562 |
| 4,914,822 A * | 4/1990 | Wetherington | .................. | 33/562 |
| 5,249,495 A | 10/1993 | Renk | | |
| 5,271,305 A * | 12/1993 | Peters et al. | .................. | 33/32.1 |
| 5,787,781 A | 8/1998 | Hile | | |
| 6,122,891 A | 9/2000 | Carpenter | | |
| 6,182,371 B1 * | 2/2001 | Newman | .................. | 33/562 |
| 8,453,341 B2 | 6/2013 | Elsasser | | |
| 8,533,927 B2 * | 9/2013 | Atherton et al. | .................. | 33/562 |
| 2006/0000102 A1 * | 1/2006 | Lawson | .................. | 33/562 |
| 2008/0250657 A1 * | 10/2008 | Bianchin | .................. | 33/16 |
| 2013/0086788 A1 * | 4/2013 | Sanchez | .................. | 33/562 |
| 2013/0255056 A1 * | 10/2013 | Atherton et al. | .................. | 33/562 |

* cited by examiner

*Primary Examiner* — G. Bradley Bennett
(74) *Attorney, Agent, or Firm* — Lawrence R. Burns

(57) ABSTRACT

Disclosed is a template and method for use in the roofing industry for cutting roofing shingles on site in multiple useful lengths with each individual cut. The template, formed of a durable material such as aluminum, comprises a base plate having an upwardly facing planar surface. Border walls rise from two adjacent sides of the planar surface of the base plate and have abutment surfaces facing inwardly towards the planar surface of the base plate. Permanent markings on the abutment surfaces and the planar surface are visible at a fixed point above the template so as to enable a person with a T-square and a cutting instrument to cut a standard size shingle piece into two useful pieces or to cut multiple shingles stacked on top of one another into two useful pieces.

9 Claims, 4 Drawing Sheets

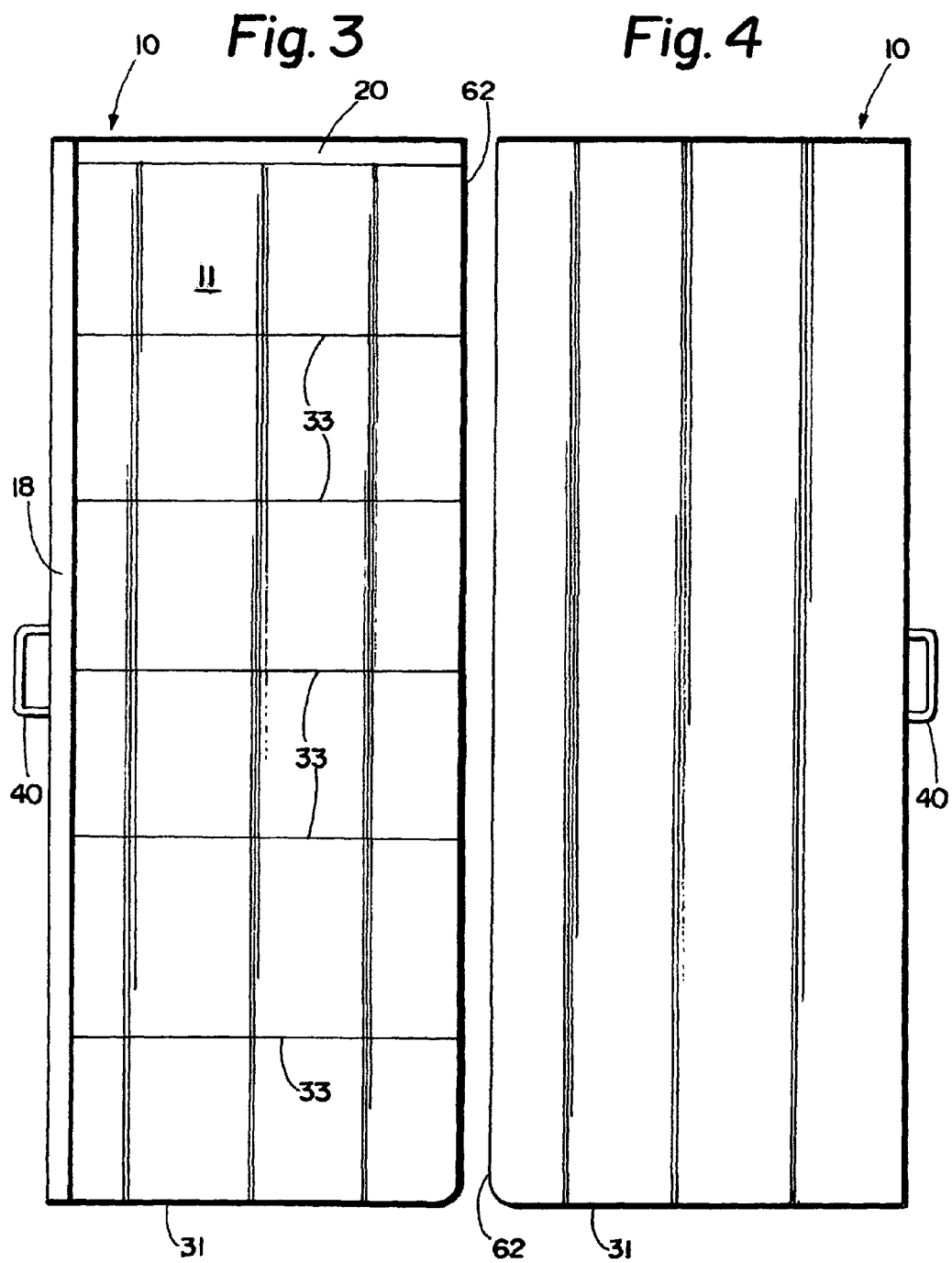

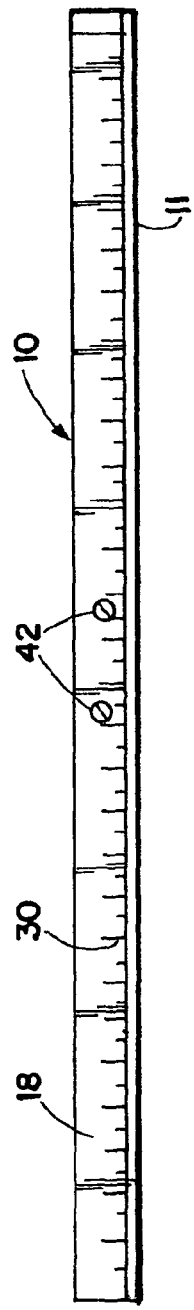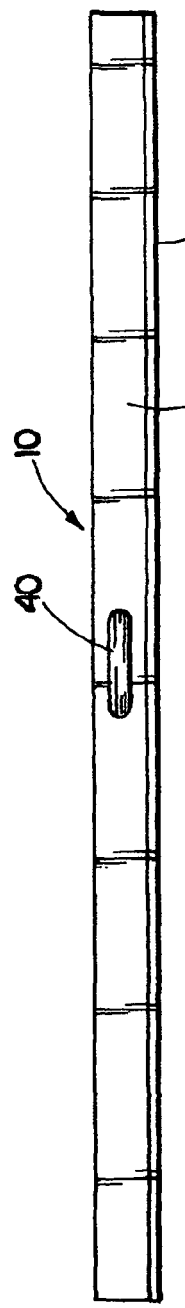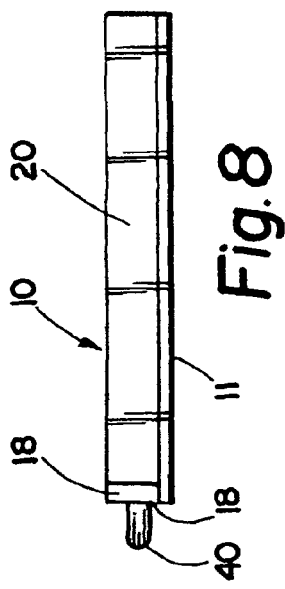

ROOFING TEMPLATE AND METHOD OF CUTTING ROOFING SHINGLES

BACKGROUND OF THE INVENTION

This invention has to do with the arrangement and method of the cutting and fastening of roofing materials, usually asphalt and/or fiberglass shingles, to the upwardly facing sides of buildings, usually residential buildings and homes. An efficient arrangement of shingles on a roof of a building requires that the shingles be cut in different standard lengths, long to short, so that the different lengths may be placed in complimentary end to end relationships with one another. The longest standard length (39 inches) is placed along the eave of the rake edge. A next and shorter shingle (32½ inches) is placed above and in an overlapping position (5⅝ inches) to the first shingle. The third and even shorter shingle (26 inches) is placed above and in an overlapping position to the second shingle. Successively shorter shingles are used in the above described manner going up the roof along the rake edge to the shortest length of 6½ inches. Usually after reaching the shortest shingle going up the roof the placement of shingles starts again on the eave edge and full length 39 inch shingles are placed in end to end abutment with the already placed shingles going up the roof. The first row of shingles is typically placed or located along a lowermost horizontal edge of the roof. The next row of shingles is started from the same edge as the first and placed vertically above the first row so that its lowermost portion overlaps an uppermost portion of the first or lowermost row. The first shingle in the row above the lower row will be a successively shorter shingle length so that the abutment lines of the end to end shingles in the lower row are covered to the extent that the shingle rows overlap vertically. Going toward the other rake edge full length shingles will be abutted to the starting rake edge shingles as they extend toward the other rake edge. Complimentary shorter shingles may be used to mate each row with the other rake edge or specially cut shingles as required. Traditionally each shingle used in the above operation is cut one at a time using a framing square, a tape measure, and a utility knife. Normal size for roofing shingles sold in large and heavy bundles is thirty nine inches in length and 13 and ¼ in width. The first shingle can start from either of the gabled ends and is not cut so as to retain its full length of 39 inches as it is placed in the lowermost corner next to the gable end. The second shingle in the row then is cut 6½ inches shorter than the first for a second standard length of 32½ inches. The third standard size shingle is then cut 6½ inches shorter than the second standard length for a length of 26 inches.

The fourth standard size shingle is then cut 6½ inches from the third standard size so as to be 19½ inches long. Each successive standard shingle will be smaller by 6½ inches from the previous one.

The first shingle in a row will be placed with its cut end aligned with the gable end and vertically overlapping the previous shingle so that so that 5 to 5⅝ inches of the first shingle is exposed vertically and 6 to 6½ inches is exposed lengthwise.

Once the operation reaches the peak the next vertical column is started and the first uncut shingle has its end abutted with the outermost end of the previous first shingle. The same procedure is followed again abutting eac successive shingle with its vertical counterpart.

The same sequence is continued until the roof is covered gable to gable at which time one to the peak at which time the ridge is capped.

BRIEF SUMMARY OF THE INVENTION

According to the present invention there is disclosed an apparatus or template for repetitive cutting and sizing of roofing material.

The roofing template comprises a base plate with bordering walls that extend outwardly in the same direction from at least two sides of the base plate with visible marks along at least one side of at least one border wall. The base plate is comprised of a rectangular planar material with visible, usually parallel, graduations along the length of the base plate. The graduations on both the base plate and the border walls are intended to aid in the uniform cutting of individual roofing material pieces and therefore said graduations from the base plate and the border walls must both be visible to an observer's view, or a point, at a fixed distance from both the plate and the border. It is further contemplated that the roofing template base plate will have a rectangular shape when viewed in plan with longitudinally and parallel spaced graduation marks extending laterally across the width of the base. In the usual adaptation the parallel graduation marks on the base will be spaced apart by a substantially equal distance between the marks. In the roofing industry the spacing will usually be 6½ inches. In order to make the template durable and able to stand up to the outside environment the material selected ie of the metal although they could be indelibly marked on the surface.

OBJECTS OF THE INVENTION

It is an object of the present invention to provide a method and apparatus to efficiently cut, arrange and fasten roofing materials to buildings.

It is an object of the present invention to provide a durable and long lasting template for use with a quick and efficient method to cut roofing materials.

It is an object of the present invention to provide a safer and easier way to cut and install roofing materials.

It is an object of the present invention to provide a portable and durable template for use in cutting roofing materials.

It is a further object of the present invention to provide a template for repeated and accurate sizing of roofing materials.

It is a further object of the present invention to provide a template with graduated markings for repeatedly sizing differently dimensioned roofing shingles.

It is a further object of the present invention to provide a template that supports substantially the entire length of an uncut shingle so that one cut can provide two standard size shingles.

It is a further object of the present invention to make a lightweight portable template to be carried to and from the job site.

It is a further object of the present invention to provide multiple cut shingles with one cutting action on a template.

It is a further object of the present invention to provide a cutting template where shingles may be placed on top of one another to produce multiple cut shingles with one cutting action.

BRIEF DESCRIPTION OF DRAWINGS

FIG. 3 is a top view of the template according to the present invention.

FIG. 4 is a bottom view of the template according to the present invention.

FIG. 5 is a side view of the template according to the present invention.

FIG. 6 is an opposite side view of the template according to the present invention.

FIG. 7 is an end view of the template according to the present invention.

FIG. 8 is an opposite end view of the template according to the present invention

DETAILED DESCRIPTION OF DRAWING

Figure 1:
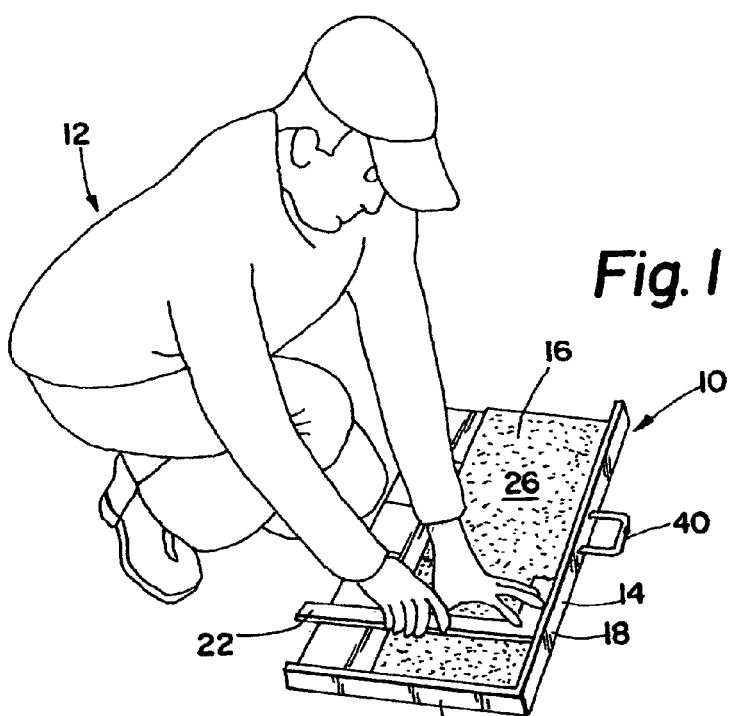
FIG. 1 is a perspective view of the environment and template of the present invention.

What is shown in FIG. 1 is a perspective view of the environment and template 10 of the present invention. The template is made from a soft aluminum that will not unnecessarily dull a cutting edge of the knife blade. Roofer 12 is shown using the template 10 according to the present invention. The template 10 is laid on a base plate 11, the base plate 11 having a flat surface 14 and a shingle 16 is placed in the template 10 so that the rectangular sides of the shingle 16 abut sides 18 and 20 of the template 10. With the shingle 16 in the template 10, roofer 12 then places his framing square shown at 22 on the first 6½ inch mark on template 10. A utility knife is then used to cut the first shingle of length 39 inches into two shingles of length 6½ inches and 32½ inches.

Figure 2:
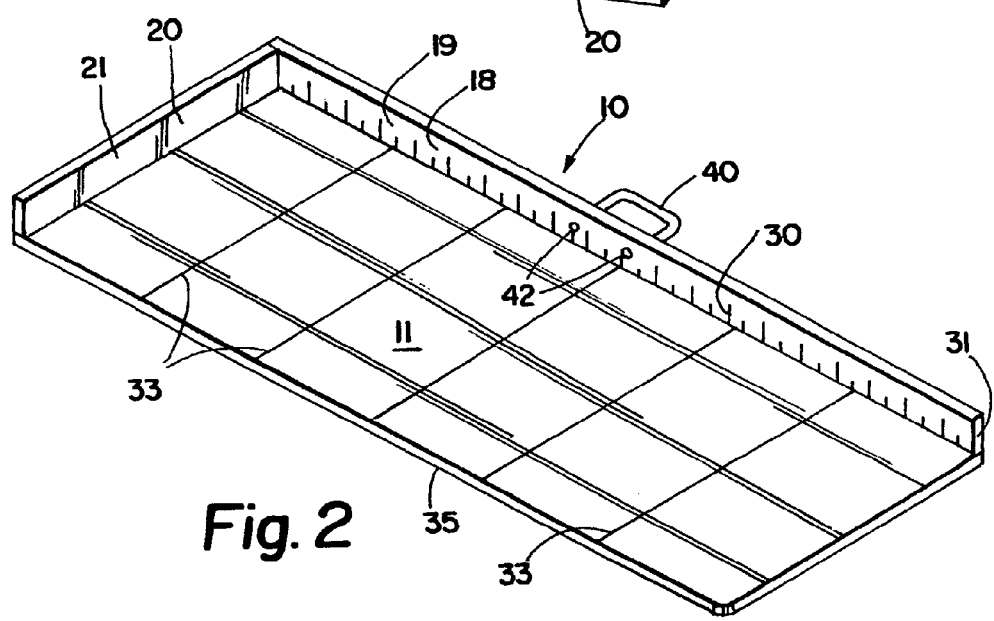
FIG. 2 is a perspective view of an embodiment of the template of the present invention.

What is shown in FIG. 2 is the template 10 according to the present invention having a base plate 11 with two border walls 18 and 20 extending upwardly from the base plate 11. The border walls 18 and 20 have abutment surfaces 19 and 21 respectfully for abutment with shingle materials that are to be positioned on the template 10. The abutment surface 19 of border wall 18 has machine markings shown at 30 all along the length of template 10 from end 31 toupwardly extending border wall 20. The machine markings 30 can be in any dimensioning system one chooses, the ones shown in FIG. 2 and for this invention are graduations in ⅛ inche increments from 0 inches at border wall 20 end to 40 inches at free end 31. The machine markings place a permanently visible measuring ability on the border wall 18 where one can measure the length of the shingles to be cut. The base plate 11 has machine markings 33 extending from the border wall 18 across its width to edge 35. Machine markings 33 are spaced equidistantly from one another and parallel to one another. In this particular example the equidistant spacings between markings 33 are 6½ inches. A carrying handle is shown at 40 that is attached by threaded connections extending through wall 18 as shown at 42. In this embodiment the base plate 11 is made from aluminum stock of ¼ inch thickness and is 40 inches long and 14¾ inches wide. The borders 18 and 20 are made from ½ thick aluminum stock with border 18 being 40 inches long and 1½ inch and a half inches tall.

What is shown in FIG. 3 is a top view of the template 10 according to the present invention. The base plate 11 is shown having markings 33 spaced equidistantly apart and parallel to one another as they extend from end 31 to border 20. The border 18 is shown extending from border 20 along one side of the base plate 11 to the end 31 and the border 20 is shown extending from the innermost wall of border 18 to the edge 62 of the template 10. Handle 40 is shown as it is attached to the border 18 of the template 10.

What is shown in FIG. 4 is a bottom plan view of the template 10 according to the present invention having an end 31 and edge 62 and a handle 40.

What is shown in FIG. 5 is a side view of the template 10 according to the present invention. The template 10 is shown with the border wall 18 upstanding on the base plate 11 and having the graduated markings 30 shown thereon the graduated markings are in ⅛ inch increments were in the markings ranged from 1 to 40 along the border wall 18 threads threaded connections 42 are shown for the handle 40 not shown in FIG. 5.

What is shown in FIG. 6 is an opposite side view of the template 10 according to the present invention. FIG. 6 shows the template 10 with its opposite side showing the backside of border 18 and base plate 11 along the bottom of the template 10 the handle 40 is shown attached by the threaded connections 42 through the border wall 18 of the template 10.

What is shown in FIG. 7 is an end view of the template 10 according to the present invention. FIG. 7 shows the base plate 11 with the border 20 upstanding from the base plate 11 and the border 18 having the handle 40 thereon. The height of the borders 20 and 18 are 1½ inches off of the one quarter inch thick aluminum base plate 11.

What is shown in FIG. 8 is an opposite end view of the template 10 according to the present invention. Shown therein is the base plate 11 having the upstanding border wall 20 that handle 40 and the end average of border wall 18.

Figure 9:
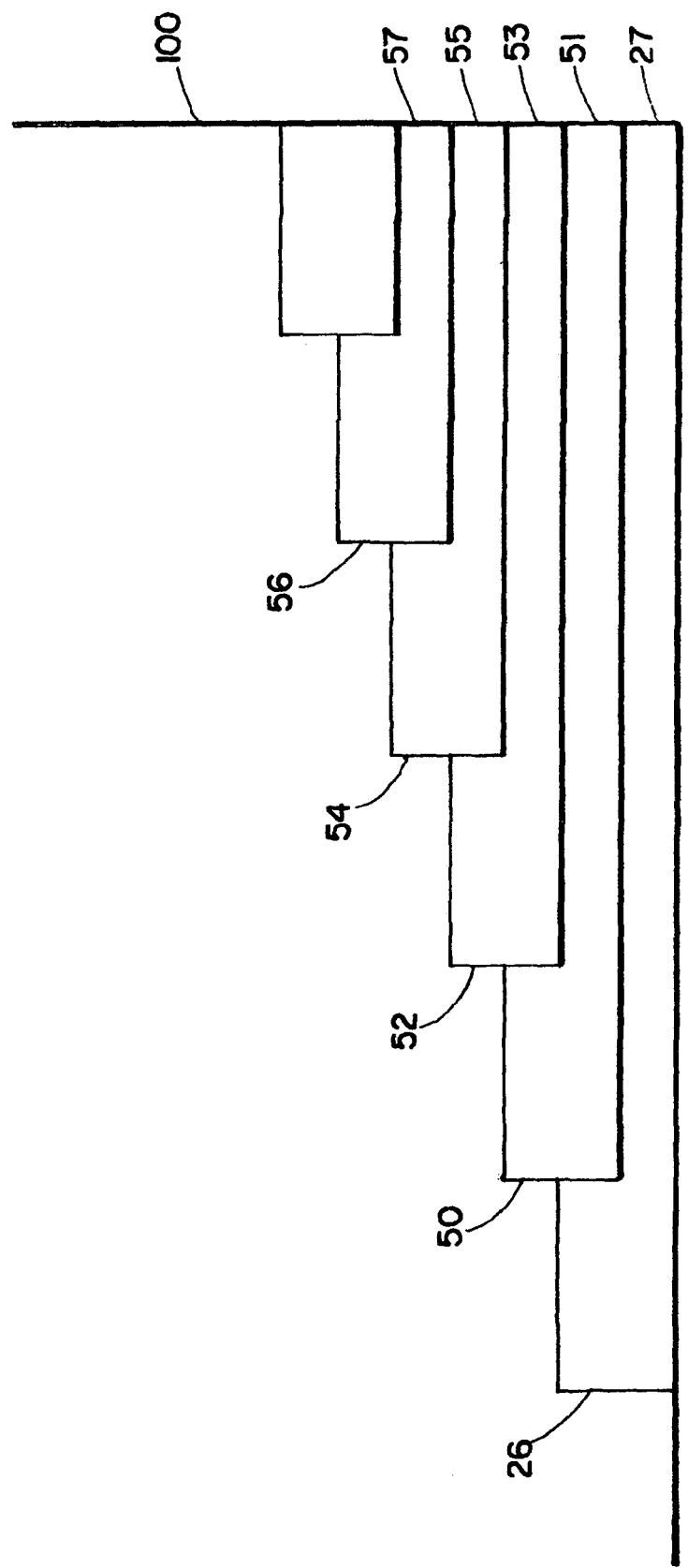
FIG. 9 is a plan view of the shingles as they are cut in successively shorter lengths

What is shown in FIG. 9 is a plan view of the shingles as they have been cut to different links and overlaid one on the other. Shingle 26 is shown at the bottom-most portion of FIG. 9 and they extend from a rake edge 100 of a roof. Shingle 26 is 39 inches long and is laid along the lowermost edge of the roof with its one edge 27 adjoining the drip edge 100. Shingle 50 is Cut next and it is cut to a length of 32½ inches been 6½ inches shorter than shingle 26. Shingle 50 is laid so that one half of its width overlaps the tap top half of shingle 26. Shingle 50 has edge 51 which adjoins a drip edge 100 of a roof. Shingle 52 is then cut so that its length is 26 inches long been 6½ inches shorter than shingle 50. Shingle 52 has edge 53 which is laid adjacent to the drip edge 100. Shingle 54 is cut to length of 19½ inches which is 6½ inches shorter than shingle 52 and has a edge 55 that adjoins the drip edge 100 of the roof. Shingle 54 is positioned so that overlaps the top half of shingle 52. Shingle 56 is cut to length 13 inches which is 6½ inches shorter than shingle 54 and overlap and the bottom part of shingle 56 overlaps the top half of shingle 54 shingle 56 as an edge 57 does it abutted to her adjacent to the drip edge 100.

The invention claimed is:

1. A roofing template which comprises:
   a. A base plate;
   b. Border walls extending in the same outwardly direction from at least two adjacent sides of said base plate;
   c. Graduated marks visible along at least one of said border walls;
   d. Graduated marks visible along a length of said base plate;
   e. Said border wall graduations and base plate graduations both being visible from a fixed point at a spaced distance from the base plate.

2. The roofing template according to claim 1 which further comprises said base plate having a rectangular shape when viewed in plan with graduation marks extending laterally across the width of the base.

3. The roofing template according to claim 2 which further comprises parallel graduation marks on said base spaced apart by a substantially equal distance between said marks.

4. The roofing template according to claim 3 which further comprises said base graduation marks being spaced apart in equal segments of six and one half inches.

5. The roofing template according to claim 4 which further comprises said base plate comprising an elongate, rectangular aluminum metal with said markings inscribed into its metal surface.

6. The roofing template according to claim 5 which further comprises abutment surfaces on said border walls.

7. The roofing template according to claim 6 which further comprises said border walls formed of an aluminum material with said graduations inscribed into its metallic surface.

8. The roofing template according to claim 7 which further comprises said base plate having the dimensions of 40 inches long by 14 inches wide by ¼ inch thick.

9. The method of sizing roofing materials which comprises:
  a. placing a dimensional shingle face down on a template;
  b. align and abut end and side of shingle with corresponding end and side walls on the template;
  c. place framing square on top of shingle and position edge of framing square next to desired mark on side wall of template;
  d. cut shingle along edge of framing square into two complimentary sized pieces for placement on a roof;
  e. remove pieces from template and place on roof.

\* \* \* \* \*